US011629301B2

(12) United States Patent
Mooney (10) Patent No.: US 11,629,301 B2
(45) Date of Patent: Apr. 18, 2023

(54) BIOSOLID TREATMENT PROCESS AND SYSTEM

(71) Applicant: Ecoremedy LLC, Mechanicsburg, PA (US)

(72) Inventor: David Mooney, Mechanicsburg, PA (US)

(73) Assignee: Ecoremedy LLC, Pittsburgh, PA (US)

( * ) Notice: Subject to any disclaimer, the term of this patent is extended or adjusted under 35 U.S.C. 154(b) by 272 days.

(21) Appl. No.: 16/942,635

(22) Filed: Jul. 29, 2020

(65) Prior Publication Data

US 2021/0032552 A1 Feb. 4, 2021

Related U.S. Application Data

(60) Provisional application No. 62/879,929, filed on Jul. 29, 2019.

(51) Int. Cl.
  *C05F 3/04* (2006.01)
  *C05F 7/00* (2006.01)
  (Continued)

(52) U.S. Cl.
  CPC .......... *C10J 3/48* (2013.01); *C02F 11/04* (2013.01); *C02F 11/10* (2013.01); *C05F 7/00* (2013.01);
  (Continued)

(58) Field of Classification Search
  CPC ...... F26B 25/22; F26B 2200/18; F26B 17/04; F26B 25/002; F26B 2200/02; F26B 25/001; C02F 11/10; C02F 11/13; C02F 11/12; C10G 2300/1003; C10G 2300/1011; Y02P 30/20; Y02P 20/145; C10J 2200/15;
  (Continued)

(56) References Cited

U.S. PATENT DOCUMENTS 4,497,637 A * 2/1985 Purdy ...................... C10J 3/485
                                                        48/209
6,948,436 B2   9/2005 Mooney et al.
(Continued)

FOREIGN PATENT DOCUMENTS

DE   102011004788 A1   8/2012
EP       3085671 A1   10/2016

OTHER PUBLICATIONS

Extended European Search Report Issued from the European Patent Office within the European Application No. 20191836.4, dated Feb. 19, 2020, 10 pages.
(Continued)

*Primary Examiner* — Imran Akram
(74) *Attorney, Agent, or Firm* — Schott, P.C.

(57) ABSTRACT

A biosolids treatment system that treats human biosolids to produce thermal energy for self-consumption for the production of beneficial use products including low carbon ash, high carbon activated biochar, and Class A biosolids. The system includes a variable feed conveyor that conveys a biosolid feed into a dryer; a dryer that dries the biosolid feed to a predetermined moisture content to create one of a beneficial use products, where the predetermined moisture content is controlled by varying the speed of variable feed conveyors and a variable feed mixer; and a gasifier that converts the biosolid feed into two of the beneficial use products.

15 Claims, 5 Drawing Sheets

(51) Int. Cl.
    *C10J 3/72*     (2006.01)
    *C10J 3/48*     (2006.01)
    *C02F 11/10*    (2006.01)
    *C02F 11/04*    (2006.01)

(52) U.S. Cl.
    CPC ........... *C10J 3/723* (2013.01); *C02F 2303/10* (2013.01); *C10J 2200/15* (2013.01); *C10J 2300/0909* (2013.01); *C10J 2300/0923* (2013.01); *C10J 2300/12* (2013.01); *C10J 2300/169* (2013.01); *C10J 2300/1643* (2013.01); *C10J 2300/1861* (2013.01)

(58) Field of Classification Search
    CPC ........ C10J 2300/0903; C10J 2300/0909; C10J 2300/0923
    See application file for complete search history.

(56) References Cited

U.S. PATENT DOCUMENTS

| | | | |
|---|---|---|---|
| 8,721,748 B1* | 5/2014 | Potgieter | C10J 3/42 48/61 |
| 8,832,962 B2 | 9/2014 | Emmanuel | |
| 10,168,098 B2 | 1/2019 | Ostermann | |
| 2007/0006528 A1* | 1/2007 | Diebold | C10J 3/20 48/197 R |
| 2008/0209753 A1 | 9/2008 | Smith et al. | |
| 2011/0061298 A1* | 3/2011 | Frey | F26B 1/005 48/78 |
| 2011/0266500 A1* | 11/2011 | Schubert | C10J 3/723 422/198 |
| 2011/0308230 A1* | 12/2011 | Takase | C10J 3/466 60/39.182 |
| 2013/0098750 A1* | 4/2013 | Nickerson | C02F 11/10 201/14 |
| 2013/0247448 A1* | 9/2013 | Ampulski | C10L 1/023 422/187 |
| 2013/0333236 A1 | 12/2013 | Grosser | |
| 2018/0142174 A1* | 5/2018 | Grainger | C10J 3/74 |

OTHER PUBLICATIONS

Response to the Communication pursuant to Rule 69 EPC Issued from the European Patent Office within the European Patent Application No. 20191836.4, dated Aug. 1, 2022, 7 pages.

* cited by examiner

Figure 1: Sludge Receiving & Storage Building with Sludge Metering Building and Material Handling Equipment

BIOSOLID TREATMENT PROCESS AND SYSTEM

BACKGROUND

There's a saying that "You can't avoid death and taxes." You could add to that: human biosolids. Humans produce about 640 billion pounds of feces and 3.5 billion gallons of urine each year. If you think generating that amount of waste is unavoidable, consider the issue of disposing of it: Just as unavoidable.

In wealthier countries, disposal companies or governmental agencies dry the waste (in particular the fecal sludge/biosolids) using fossil fuel and land apply it as "natural fertilizer" or dispose of it in landfills. Some countries dispose of it in the oceans as well, though this practice is prohibited in most countries. Other countries incinerate the biosolids which generates horrible air quality concerns.

Since the US Clean Air Act of 1963, incineration of biosolids in the United States has been phased out due to air emission rates well in excess of permittable limits. Nearly no new incinerators have been permitted in the last two decades. In 2019, approximately 67% of all biosolids produced are land applied and 33% of all biosolids are landfilled. On Nov. 15, 2019, the U. S. EPA's Office of Inspector General (OIG), an independent review branch of the EPA, released a report reviewing EPA's biosolids regulatory program. The report identified 352 pollutants that cause severe environmental and human health concerns when leached into the ground and waterways that the EPA is not sufficiently monitoring. Upon reading the report, states independently placed moratoriums on land application of biosolids and landfills are no longer accepting biosolids for disposal creating the impossible situation of unstoppable biosolids production with no disposal options.

Thus, there exists a need for a human biosolids treatment solution that can handle human biosolids, remove its moisture, break down harmful chemicals, produce a biochar with desirable properties, with a minimal environmental footprint.

SUMMARY OF THE EMBODIMENTS

A biosolids treatment facility that treats human biosolids to produce a low carbon ash (LCA), dried Class A biosolids, and/or carbon rich biochar products (HCAB), where the feed rate into a dryer is modulated in response to a measured moisture content of blended human biosolids and recirculated dried Class A product.

As described herein, a gasifier may produce LCA and HCAB, while the dryer produces the Class A biosolids. As mentioned, discussed herein, the dryer's Class A biosolid may be conveyed back to the gasifier, which converts all carbon in the overall system to energy, with LCA as the only byproduct. This is made possible using the plume abatement heater, the absence of which leaves a functioning system where excess energy is recovered in solid form with the gasifier producing LCA and the dryer produces Class A biosolids OR the gasifier produces only HCAB and no Class A product.

While biosolids are mostly discussed herein, the treatment system is configured to use comingled materials generated by a wastewater treatment facility (WWTF) as well, including grit and screenings, fats/oils/grease (FOG), anaerobically digested biosolids, biosolids post thermal hydrolysis treatment, primary/secondary waste activate sludge, non-activated sludge in varying percent of composition as fuel sources for the gasifier without need for supplemental fuel.

DETAILED DESCRIPTION OF THE EMBODIMENTS

1. Facility Introduction

The novel biosolids treatment process and combination of equipment presents an alternative to the land application, incineration, composting, or landfilling of biosolids, all of which are increasingly problematic in biosolids management. The process, using the facility, converts dewatered municipal biosolids ("sludge cake") generated at wastewater treatment plants (WWTPs) to renewable energy and three value added products (low carbon ash, high carbon biochar, and Class A dried biosolids) preferably without the use of supplemental fuels (natural gas, oil, biomass, etc.), which are not required.

An initial design of a first treatment facility's footprint was approximately 0.25 acres with site disturbance limited to the foundation footers and slab required for the storage and process buildings. A negative pressure one-story building houses the biosolids gasification and drying sections. The enclosed facility is not subject to leaching, runoff, or wind. There are no outfall pipes that discharge to surface streams or drainage channels and wastewater discharge from the facility may be routed to a wastewater treatment plant.

Ancillary equipment and structures located adjacent to the gasifying and drying process building may include mechanical equipment for receiving, storing, and conveying biosolids into the building. Conveyance and storage equipment for the Class A products may also be housed in the ancillary building.

Air emissions from the facility are very low to begin with and are further controlled by a wet scrubber and activated carbon filter. Air emissions from the facility are similar in content to combustion of natural gas.

2. Treatment Process and Equipment

The waste treatment process involves the thermal drying of dewatered biosolid to produce a Class A biosolid that can be used as a fertilizer, soil conditioner, and/or a renewable fuel product. Class A biosolids meet the requirements established under 25 Pa. Code § 271.932(a) in regard to pathogens and 25 Pa. Code § 271.933(b)(1)-(8) relating to vector attraction reduction, (also found in US EPA Part 503 Biosolids Rule, Chapters 2, 5, and 6), are nonliquid, and are unrecognizable as human waste.

The process may also produce a renewable fuel coproduct with as-is energy value ≥5,000 Btu/lb as defined in 25 Pa. Code § 287.1 as a beneficial use product. Further, the biosolids gasifying drying facility satisfies the time-temperature requirement of Regime B as identified in Table 5-3 of US EPA Part 503 Biosolids Rule, Chapter 5 for Class A pathogen reduction.

The facility reduces the attractiveness of biosolids to vectors by drying the biosolids to >90% solids content as identified in Table 5-8, Option #8 of US EPA Part 503 Biosolids Rule, Chapter 5 for Class A vector attraction reduction. The system can process dewatered biosolids cake as wet as 15% total solids content.

The unloading process and storage may be maintained at a negative pressure and minimal onsite storage in a building maintained at a negative pressure may ensure all odors are contained inside the building thereby minimizing nuisance complaints.

2.1 Pre-Processing Overview

To put the system in context, it may be helpful to review the process from the step of biosolids sludge delivery to the treatment system, it being understood that the delivery steps may be performed in many other ways.

Figure 1:
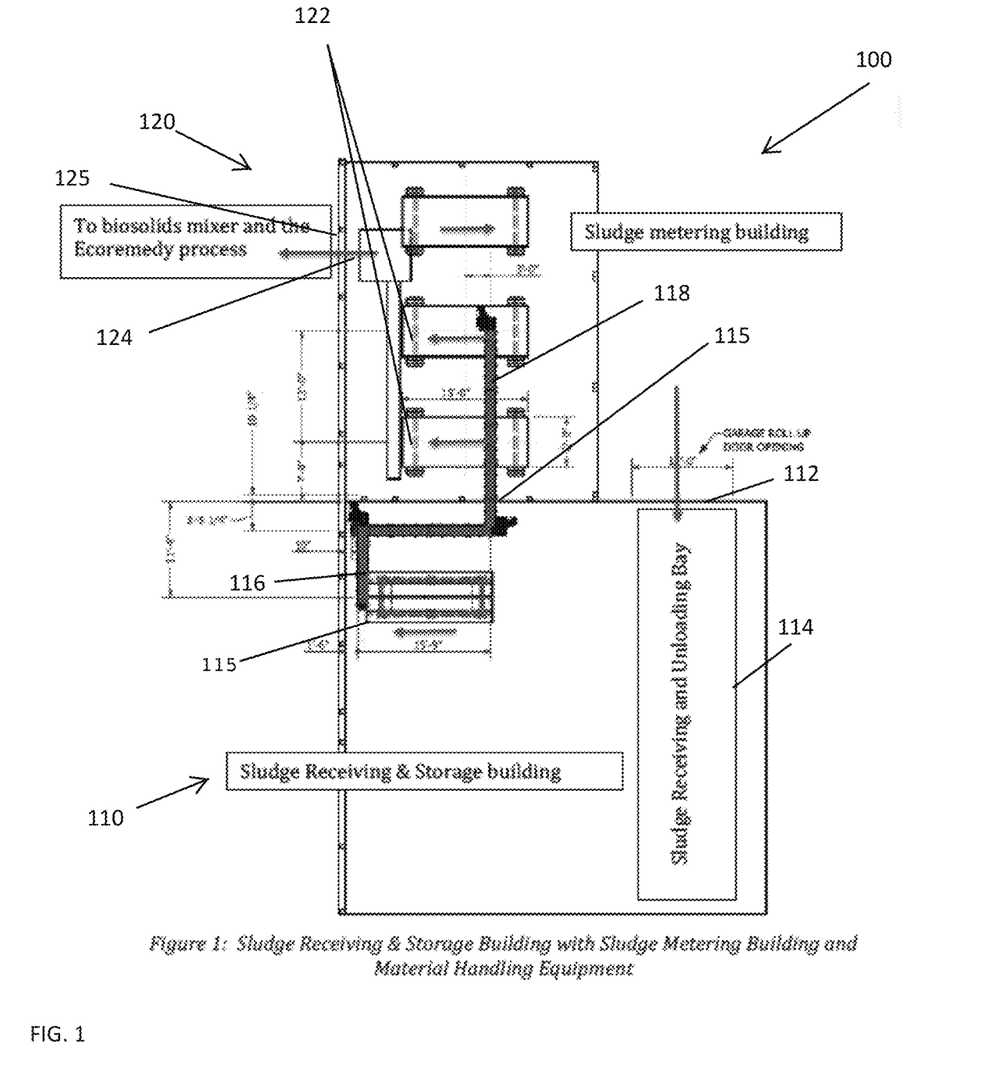
FIG. 1 shows a figurative overview of the receiving and metering buildings.

FIG. 1 illustrates an overview of the sludge receiving and metering facility 100, which includes the sludge receiving building 110 (that receives the trucks) and sludge metering building 120 (where certain measurements are taken the sludge is prepared before treatment). The sludge receiving building includes the rollup door 112 that allows trucks to access the sludge receiving building 110 and in particular the building's interior unloading bay 114. The sludge receiving and metering facility 100 includes an elevating conveyor 116 that conveys sludge received from the trucks upwards to a metering building conveyor 118 that spans the buildings 110, 120 via a port 115 into the sludge metering bins 122 located in the sludge metering building 120.

Within the metering building 120, sludge may be tested and stored before final transfer (which could be done via a treatment facility conveyor 124 (which may be a screw conveyor) that exits through a treatment port 125 between the metering building 120 and the treatment facility/building 200. Arrows indicate the direction of material flow. Within the metering building 120, technicians may test the sludge for chemical composition, moisture content, weight, volume.

The metering bins 122 may be graduated indicating the volume at different levels. A technician may record the sludge level before and after filling each metering bin 120, calculating the displaced sludge volume, and thus the mass flow rate entering the treatment building 200 can be calculated with the bulk density of the material.

2.2 Treatment Facility Operation

Figure 2A:
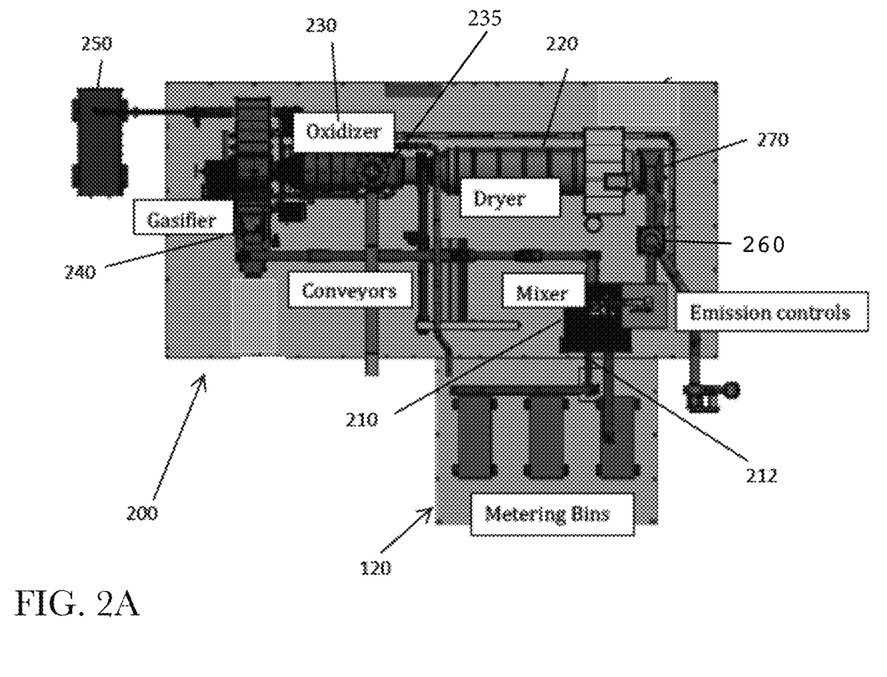
FIGS. 2A-2C show a multiple embodiment overviews of the treatment equipment.
Figure 2B:
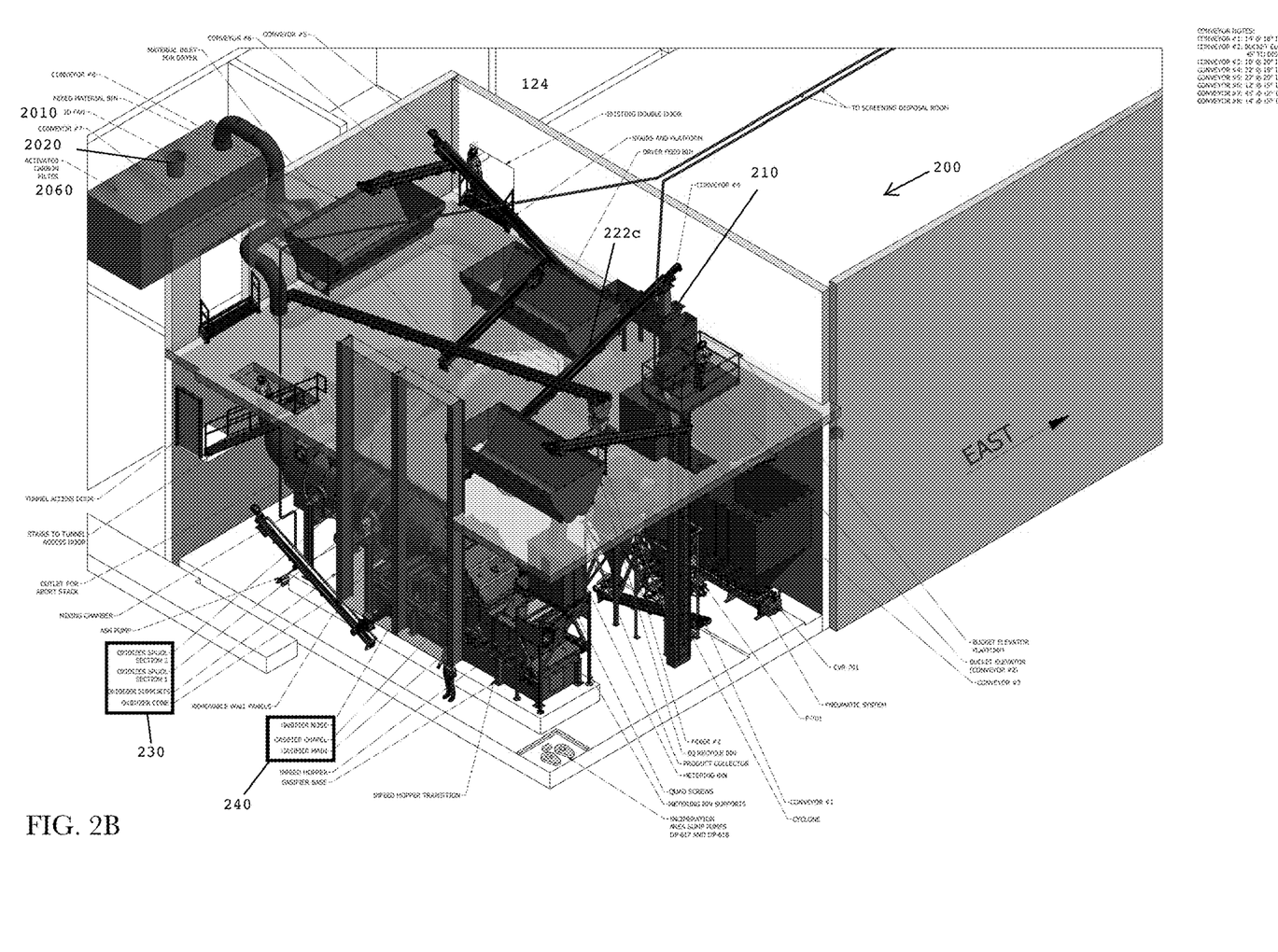
Figure 2C:
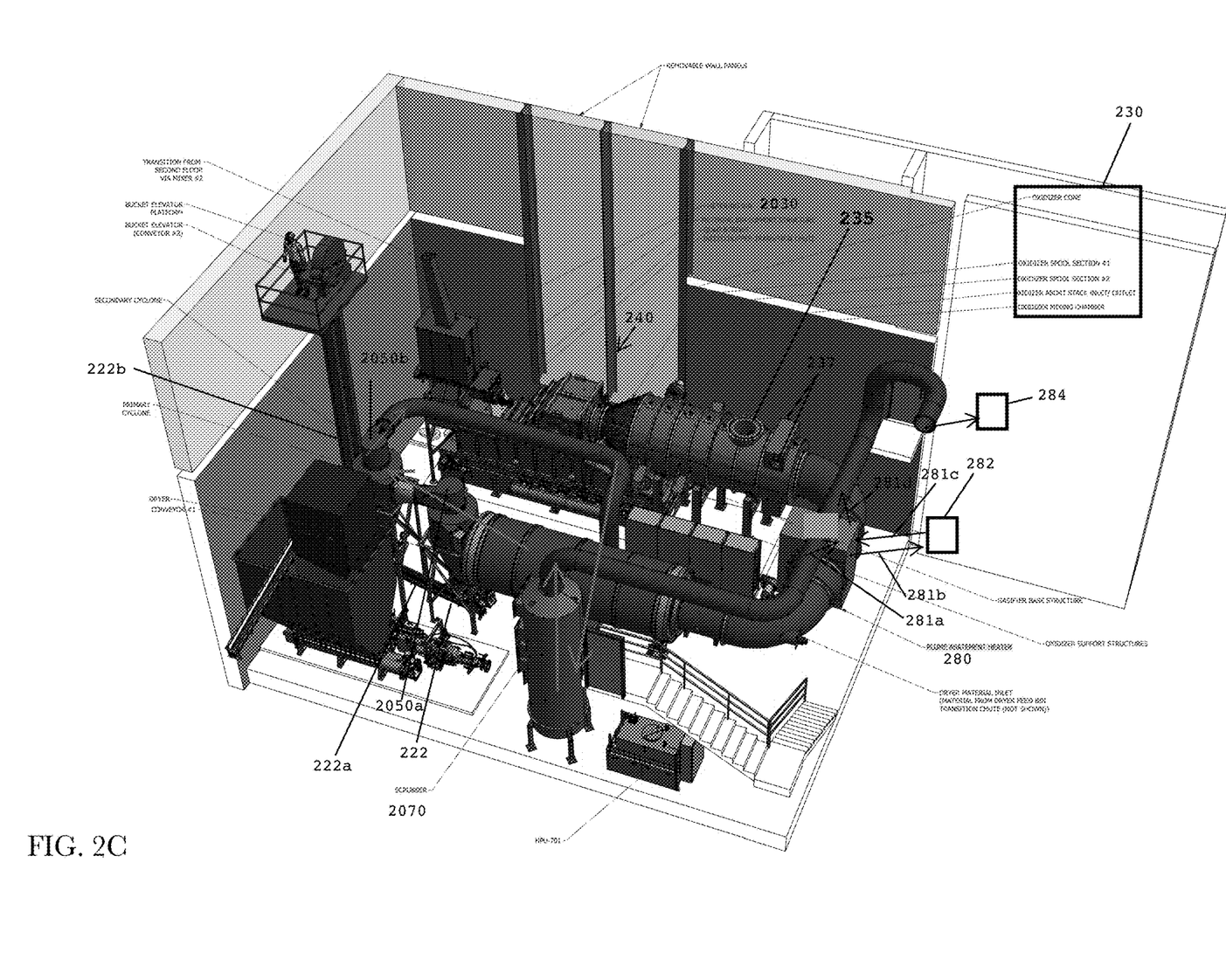

As shown in FIGS. 2A (a simple overview) and 2B/2C (a more detailed and thorough view) treatment facility conveyors 124 deliver the sludge to the treatment building 200, and in particular a conventional biosolids mixer 210 (paddle, pug mill, pin mixer, or other) within a treatment building 200 where wet biosolids cake (average of 20% solids, ranging from 15% to 30% solids) is mixed with recirculated dried Class A product (average of 93% solids) from an output 222 of the dryer 220, to create a blended feed mixture (mixed biosolids) ranging between 50% to 75% total solids. The mixed biosolids are conveyed (via conveyor 222a and vertical lift conveyor 222b) to the direct contact, rotary drum dryer 220 for heat treatment that yields Class A product and also sent to the gasifier 240 via conveyors 222c and mixers to the gasifier metering bin 2030 as the exclusive fuel source for generating the thermal energy needed to dry the mixed biosolids to >90% total solids. The mixed biosolids are the sole energy source for the evaporation of water from the mixture. The gasifier 240 described herein may be of the type described in U.S. Pat. No. 6,948,436, the contents of which are incorporated by reference as if fully set forth herein.

The biosolids gasifier 240 heats the wet mixed biosolids using self-sustaining heat recovery from the system in an oxygen deficient chamber where the biosolids are converted to volatile gases (syngas) and low carbon ash or high carbon biochar, depending upon process purpose. The ash/biochar is automatically conveyed from the system as a beneficial byproduct for use as a soil amendment, fertilizer, or activated carbon filter media (as described below).

The volatile syngas is channeled into a separate chamber downstream from the gasifier 240 to an oxidizer 230 where controlled combustion is achieved. Combustion occurs when adequate air is introduced to the syngas in the oxidizer balancing the combustion equation resulting in exothermic energy release achieving temperatures ranging between 1800 F-2200 F.

The hot flue gases leave the oxidizer 230 and enter a flue gas tempering chamber (blend box) 235 where ambient air and moist recirculated dryer exhaust are mixed with the hot flue gas to achieve a controlled "tempered" flue gas temperature in the range of 700 F-1400 F, depending on biosolids characteristics and process purpose.

The blend box 235 is designed to mix the hot oxidizer flue gas (>2000 F) with ambient air (+/−70 F) and moist recirculated dryer (dryer 220) exhaust (+/−240 F) to a set target temperature (700 F-1400 F). The target temperature is achieved by controlling the induced ambient air with a temperature-controlled damper operating from a thermocouple placed in a strategic location within the blend box 235 and the recirculated dryer exhaust with a variable frequency drive (VFD) on a recirculation fan motor that allows the operator to vary the flow rate of the recirculated dryer exhaust. Together, these two control points enable an operator (or automated operating controls but discussed herein as operator) to achieve accurate and stable temperature control exiting the blend box 235.

Contained within the blend box 235 is a shell and tube air-to-air heat exchanger designed to preheat ambient air for use in the gasification process (this gasifier air preheater is within the blend box 235, with visible inlet/outlets 237 in FIG. 2C)) and further lower the flue gas temperature to a "target" temperature. Furthermore, the tubes of the gasifier air preheater cause flue gas turbulence ensuring complete blending of gases for a uniform gas temperature exiting the blend box 235.

When sludge characteristics and process purpose allow, a customized two-pass, crossflow, plume abatement heat exchanger 280 (plume abatement HX) is installed between the gasifier air preheater and the dryer inlet. The tempered flue gas exiting the blend box 235 is used to heat the dryer exhaust in two steps. First, after passing through the mechanical cyclone (2050a, 2050b) and then the wet scrubber 2070 of the emission train (each removing further particulate, following the arrows and piping as shown), the saturated exhaust from the wet scrubber 2070 is routed through piping 281a to the plume abatement HX 280 where excess energy, not needed for the evaporation of moisture from the mixed biosolids, is used to heat the exhaust gases to a controlled temperature thereby dropping the relative humidity of the flue gas stream prior to entering, through additional piping 281b, a activated carbon filter (ACF) 282. Low relative humidity gas flow maximizes the performance of activated carbon. High temperature flue gas minimizes ACF performance so accurate temperature control of the heated gas may be a design consideration After the ACF 282, the flue gas passes through the piping 281c in a second pass of the plume abatement HX 280 to superheat the exhaust to minimize plume before routing the exhaust through piping 281d to the final discharge point 284 to atmosphere.

The heat source for the plume abatement HX 28 is the tempered flue gas exiting the blend box 235. In the same manner that it is important to control temperature entering the ACF 282, control of the temperature of the hot flue gas may be maintained while entering the dryer 220. The dryer inlet temperature may be controlled using a system of dampers in the flue gas stream that direct flow through the plume abatement HX 280. In this manner, accurate control of both gas streams (entering the ACF 282 and entering the dryer 220) may be controlled to target temperatures set by the operator. Target temperatures entering the dryer 220 may range between 600 F-1100 F. The direct contact dryer 220 may be conventional to industry.

A portion of the dried Class A product (average of 93% solids) may be recirculated from the dryer outlet 222 as discussed above for blending with the inbound wet biosolids cake. The ratio of dry to wet biosolids for the mixer is determined by an inline moisture sensor 212 on the discharge of the mixer 210 and manually checked by periodic operator testing.

After much testing, the inventors found that flexibility to accurately control the mixer output to a range between 35% to 75% solids content is necessary to treat all varieties of municipal sludge with keeping below the sticky phase of the sludge, a phase that makes the operation challenging to manage. This mixed sludge quality is determined by the target fuel specifications for the gasifier 240.

Target temperature flue gas exits the blend box 235 and plume abatement HX 280 before entering a direct contact dryer 220 where it is the heat source for evaporating the water from dewatered mixed biosolids ranging between 35% to 75% solid content (same blended biosolids used for the gasifier fuel). The dried product may be conventionally sold as Class A product that is ≤10% MC (90% DM). The system may recycle the dried Class A product for mixing with incoming dewatered biosolids cake at ranging from 15% solids to >30% solids content.

The blended biosolid mixture ("mixed biosolids") may be used as the exclusive fuel for the gasifier 240 and the input biosolids to the direct contact dryer 220. With the plume abatement HX 280 installed, the closed-loop system is estimated to be +/−94% efficient for energy repurposing.

The evaporated water from the biosolids pass from the dryer 220, through a high efficiency cyclone collectors 2050*a*, 2050*b* (260, 270 in FIG. 2A) to capture 99% of particulate matter larger than 10 micron (PM10), then through a three-stage wet scrubber system 2070 equipped with alkaline treatment to ensure the capture of the majority of the remaining PM and treat for residual odors and SO2 prior to emitting to the atmosphere. The clean water vapor plume is drawn from the system using an induced draft fan 2010 that blows the moist exhaust through an activated carbon filter 2060 to perform final pollutant polishing prior to exiting the facility stack 2020.

3. Process Byproducts and Design Considerations

The treatment process produces three types of beneficial coproducts. The process begins by mixing dewatered biosolids cake (ranging from 82% water content to 70% water content) with recirculated dried Class A biosolids (+/−7% water content) to create a resulting mixed biosolids (ranging between 50% water content to 25% water content) for use as the exclusive gasifier fuel and the inlet material to the dryer. The three coproducts generated from the system are:

1. Low carbon ash (LCA)—This coproduct has beneficial use as a fertilizer, alternative liming material for alkaline stabilization, and/or ingredient for improving the strength and porosity characteristics of building materials. The LCA is automatically conveyed out of the gasifier to an ash collection bin where it may be periodically hauled offsite.

2. High carbon activated biochar (HCAB)—This coproduct has beneficial use as a soil amendment, activated carbon filter media, and/or ingredient for improving the strength and porosity characteristics of building materials. The HCAB is automatically conveyed out of the gasifier to a collection bin where it may be periodically hauled offsite.

3. Excess dried Class A biosolids (7% water content) can be collected for use as a Class A fertilizer and/or alternative renewable fuel source. Class A Biosolids is conveyed to a collection bin where it may be periodically hauled offsite.

As described herein, the gasifier 240 may produce LCA and HCAB, while the dryer 220 produces the Class A biosolids. The dryer's Class A biosolid may be conveyed back to the gasifier 240, which converts all carbon in the overall system to energy, with LCA as the only byproduct. This is made possible using the plume abatement heater, the absence of which leaves a functioning system where excess energy is recovered in solid form with the gasifier producing LCA and the dryer produces Class A biosolids OR the gasifier produces only HCAB and no Class A product.

The treatment system gasifier/oxidizer arrangement 240, 230 uses mixed biosolids as the exclusive fuel source for the treatment process. Volatile syngas, predominantly hydrogen and carbon monoxide, is produced in the gasifier 240 and pulled into the oxidizer 230 by the draft that is established and maintained by an induced draft (ID) fan 2010 located at the end of the process following the wet scrubber and before the activated carbon filter. The production of syngas is an exothermic reaction resulting in temperatures (>900 F) adequate to sustain the carbon conversion operation and kill all pathogens.

In operation, the mixed biosolids fuel may remain in the gasifier 240 at temperature >900 F for 30-90 minutes. The gasifier 240 operates under a controlled draft.

The resulting ash from the gasifier 240 is one of the stated beneficial use products of the process. The ash may be stored in a covered 30-yard roll-off container providing weeks of storage. Once full, the roll-off container may be replaced with an empty 30-yard roll-off without stopping the process.

The duration of product exposure to elevated temperatures within the gasifier 240 kills all pathogens for Class A product and may thermally destroy Per- and polyfluoroalkyl (PFAS) compounds that are extremely harmful to human health to trace limits. The solids content of >90% satisfies the VAR requirement for Class A product. The gasifier ash may be tested for metals content to prove their qualification as Class A land application product. In the oxidizer 230, the volatile syngas is mixed with ambient air to balance the combustion equation and oxidation occurs, reaching temperatures in excess of 2000 F, which may thermally destroy vapor phase PFAS compounds to trace limits.

A controlled and consistent temperature entering the dryer 220 is achieved by mixing the hot flue gas from the oxidizer (>2000 F) with ambient air and recirculated moist flue gas from the dryer 220 exhaust in a tempering chamber called the blend box.

Target dryer inlet temperature may be achieved with a temperature-controlled damper on the ambient air inlet. Ambient air supply for the blend box comes from the sludge receiving and storage and metering buildings 110, 120 thereby establishing the negative pressure to achieve odor control.

The tempering air flow into the blend box may result in air changes every hour in the sludge storage rooms that exceed limits imposed for office space and hospitals.

In addition to benefiting from its temperature cooling properties, recirculated flue gas is conventional practice for reducing NOx emissions. Once in the dryer 220, the tempered flue gas comes in direct contact with the mixed biosolids evaporating the moisture to a dried solids condition of >90% satisfying Class A requirements.

The dried biosolids product is one of the stated beneficial use products of the process described herein. The Class A dried biosolids product may be stored in a 40-yard roll-off container providing 10 days of storage. Once full, the roll-off container is replaced with an empty 40-yard roll-off without stopping the process.

The duration of product exposure to elevated temperatures (mean temperature is >450 F) within the dryer is 12 minutes satisfying the pathogen kill requirements for time and temperature for Class A product. The solids content of >90% satisfies a VAR requirement for Class A product. Dried biosolids may be tested for metals content to prove their qualification as Class A product. Furthermore, a proximate analysis may be performed on the dried solids to confirm the energy content is ≥5000 Btu/pound satisfying the requirement to sell the product as a renewable fuel.

Air emissions are controlled with a high efficiency mechanical cyclone collector to capture >99% of particles larger than 10 microns. The flue gas stream exits the cyclone to a 3-stage wet scrubber where the final particulate matter may be captured prior to passing through an activated carbon filter prior to emitting to the atmosphere. The 3-stage wet scrubber is equipped with bleach and caustic soda to scrub odors and sulfur emissions, if necessary. The total wastewater from the process is scrubber blowdown which is routed to the headworks of the WWTP for processing.

The treatment process satisfies the time-temperature requirement of Regime B as identified in Table 5-3 of USEPA Part 503 Biosolids Rule, Chapter 5 for Class A pathogen reduction and reduces the attractiveness of biosolids to vectors by drying the biosolids to >90% solids content as identified in Table 5-8, Option #8 of USEPA Part 503 Biosolids Rule, Chapter 5 for Class A vector attraction reduction.

Beneficial products produced from the treatment facility are Class A products for land application and renewable fuel coproducts.

4. Material and Waste Inventory

There may be two chemical storage tanks for the operation of a wet scrubber, which may not exceed 50 gallons each. One tank may contain 12.5% concentrated solution of sodium hypochlorite (NaOCL, bleach) and the other may contain a 25% concentrated solution of caustic soda (NaOH, sodium hydroxide).

The sodium hypochlorite and caustic soda storage containers may be mounted above a containment basin. This basin nay be sized for full leakage potential and contain the material from both tanks if they both emptied at the same time.

In the event of a spill, the contents within the containment basin may be pumped into a secure container and properly disposed in an approved landfill. Operator protection is provided with a pull chain activated, heated shower with integral eye wash station located immediately adjacent to the chemical containment basin. The shower may drain to the headworks of WWTP.

There may be discharge water produced from the wet scrubber, which may be routed directly to a wastewater treatment facility (WWTP).

5. Waste Generation Process

A facility such as the one proposed may be chosen based on a desire to harness the currently land applied or landfilled dewatered sludge cake produced by a WWTP. There are more than 16,000 WWTP in the United States and all have a sludge disposal problem.

Figure 3:
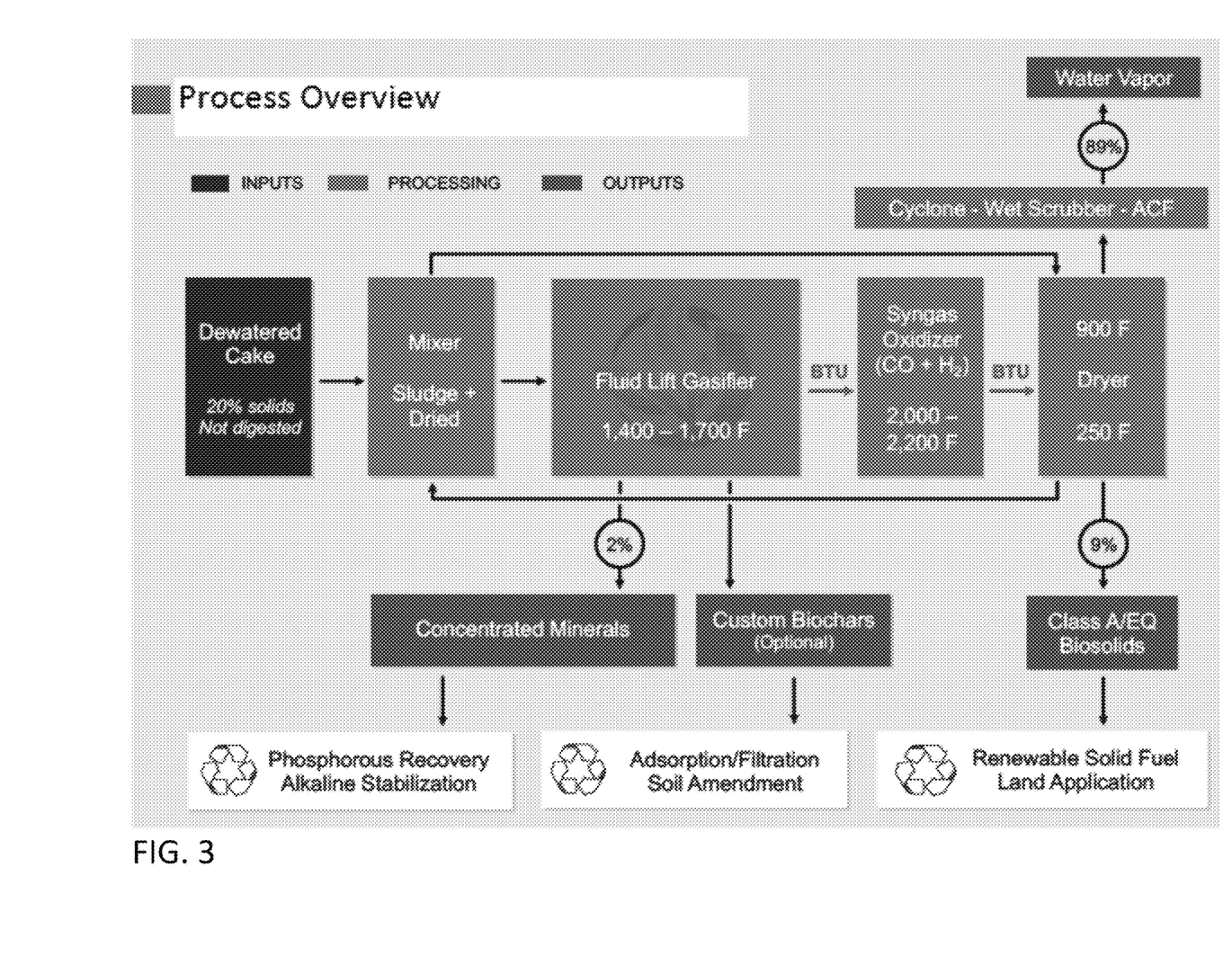
FIG. 3 shows an overview of the process described herein.

The process shown figuratively in FIG. 3 produces three types of beneficial use products from different process apparatuses. The project may not generate a waste other than blowdown from the three-stage wet scrubber that may be discharged to the headworks of the WWTP for treatment. Said another way, the process may produce beneficial use products (BUPs), not wastes.

Dewatered biosolids cake ranging between 82% water content to 70% water content may be mixed with self-generated dried Class A biosolids at <10% water content to create a resulting mixed sludge for the gasifier and the dryer. This mixed sludge may be introduced into the gasifier at high temperatures (900 F-1600 F) where pyrolysis occurs, and volatile gases are removed and oxidized. After moving through the gasifier, two BUPs can result depending on the energy content of the biosolids cake:

1) Low carbon ash—This product is conveyed out of the gasifier to an ash trailer where it may be periodically sold for use as an all-natural fertilizer or a strength and hydroscopic enhancement ingredient for construction materials. If no market is available, the low carbon ash is benign and can be disposed in a landfill.

2) High carbon activated biochar—This product is conveyed out of the gasifier to an ash trailer where it may be periodically sold for use as an all-natural soil amendment, alternative to activated carbon filtration and adsorption media, or a strength and hydroscopic enhancement ingredient for construction materials. If no market is available, the biochar is benign and can be disposed in a landfill.

The thermal drying process may include of a direct contact rotary drum dryer with all associated product collection equipment. The mixed sludge that is sent to the dryer exits the dryer at 7% water content which may then be recycled back to the process to be incorporated with the dewatered biosolids cake via a mixer. A volume of recycled dried product can be adjusted for processing efficiencies. In this event, the non-recycled portion of the dried Class A biosolids is collected for sale as fertilizer or as a renewable energy fuel in the form of alternative coal. If no market is available, the Class A product can be used as landfill cover.

3) Class A Biosolids—This product is conveyed from the dryer outlet to Class A Biosolids bin where it may be temporarily stored before sold for beneficial uses.

Water blowdown from the wet scrubber may be sent directly back to the headworks of the WWTP to be treated. Water vapor from the drying process may exit the system via the exhaust stack and be sent to atmosphere.

One point worth noting is that the prior art systems have fed the dryer with a fixed flow rate of sludge and changed the firing rate of fossil fuel burners to react to the evaporation rate needed in the dryer. The system here can work differently than this by fixing the firing rate of the gasifier since the energy conversion through gasification must be controlled and then vary the feed rate to the dryer based on the available energy from the gasifier. This one control change is not done in the drying industry.

Another notable unconventional control logic difference is that the induced draft (ID) fan 2010 is variable frequency driven (VFD) to control draft in the gasifier. The ID fan increases and decreases speed to maintain a constant draft in the gasifier when flue gas temperature controllers (induction air damper in blend box 235 and dryer exhaust recirculation fan in blend box) change the total system flue gas flow. A VFD ID fan is critical to maintain desired gasification performance whereas conventional biosolids drying systems have a fixed speed ID fan 2010 because a controlled draft is not important with fossil fuel burners.

In the process, as can be seen, the placement of the oxidizer is before the dryer rather than industry convention being the last piece of equipment prior to atmospheric discharge.

While the invention has been described as shown and described herein, a person of ordinary skill in the art would understand that various changes or modifications may be made thereto without departing from the scope of the claims.

The invention claimed is:

1. A human biosolids treatment system comprising:
a source of human biosolids;
a dryer configured to dry the human biosolids to a predetermined moisture content to create dried biosolid output including Class A biosolids;
a source of wet biosolids;
a mixer configured to mix the dried biosolid output and the wet biosolids and output a mixed biosolid feed;
a moisture sensor configured to measure a moisture content in the mixed biosolid feed;
a gasifier;
a variable feed conveyor; and
a controller;
wherein the variable feed conveyor is configured to variably recirculate the mixed biosolid feed to the dryer and/or variably convey the mixed biosolid feed to the gasifier;
wherein the controller is programmed to modulate the recirculation rate into the dryer in response to a measured moisture content of the moisture sensor,
wherein the mixed biosolid feed is the sole fuel for the gasifier; and
wherein the gasifier is configured to convert the mixed biosolid feed into usable thermal energy for system use and at least one of low carbon ash and high carbon activated biochar.

2. The biosolids treatment system of claim 1, wherein the dryer is configured to use heat treatment to create the Class A biosolids and the gasifier comprises an oxygen deficient chamber to create the high carbon activated biochar and/or low carbon ash.

3. The biosolids treatment system of claim 1, wherein the treatment system includes a blended air intake to temper flue gas entering the dryer, wherein the blended air controls a target temperature in the dryer.

4. The biosolids treatment system of claim 1, wherein the treatment system includes a fan to recirculate moist dryer exhaust to temper flue gas entering the dryer, wherein the blended air controls a target temperature in the dryer and reduces NOx emissions.

5. The biosolids treatment system of claim 1, wherein the system is configured to control carbon content of the high carbon activated biochar by controlled combustion in an oxygen deficient chamber.

6. The biosolids treatment system of claim 1, wherein the high carbon activated biochar is a beneficial use product as an activated carbon filter media and an activated carbon filter is used is used to filter air emissions from the system prior to discharge to atmosphere.

7. The biosolids treatment system of claim 1, further including a water quench configured to cool the low carbon ash or the high carbon biochar prior to leaving the gasifier.

8. The biosolids treatment system of claim 1, further including a water quench configured to serve as an air lock to the gasifier enabling a negative pressure draft to be controlled within the gasifier.

9. The biosolids treatment system of claim 1, wherein the sources possess different moisture contents.

10. The biosolids treatment system of claim 1, wherein either source comprises comingled materials generated by a wastewater treatment facility (WWTF) including grit and screenings, fats/oils/grease (FOG), anaerobically digested biosolids, biosolids post thermal hydrolysis treatment, primary/secondary waste activate sludge, and/or non-activated sludge in varying percent of composition.

11. The biosolids treatment system of claim 1, further including a plume abatement heat exchanger configured to treat gas exiting the dryer before sending the gas to an activated carbon filter.

12. The biosolids treatment system of claim 11, wherein gas exiting the activated carbon filter returns to the plume abatement heat exchanger for superheating before emission to atmosphere to minimize plume created by moisture in the gas.

13. The biosolids treatment system of claim 11, wherein the controller is configured to control a wet scrubber to treat the gas exiting the dryer before the gas is treated by the plume abatement heat exchanger.

14. The biosolids treatment system of claim 11, wherein the gasifier and dryer are separate elements.

15. The biosolids treatment system of claim 1, further comprising an oxidizer configured to receive a volatile syngas from the gasifier and combusts the volatile syngas to produce a hot flue gas, which is mixed with ambient air and recirculated air from the dyer in a blend box to produce a temperature-controlled air for the dryer.

* * * * *